(12) United States Patent
Akafuji et al.

(10) Patent No.: US 11,162,588 B2
(45) Date of Patent: Nov. 2, 2021

(54) SEAL STRUCTURE AND TRANSMISSION INCLUDING THE SAME

(71) Applicants: AISIN AW CO., LTD., Anjo (JP); NOK CORPORATION, Tokyo (JP)

(72) Inventors: Daisuke Akafuji, Okazaki (JP); Kazuya Kawamura, Anjo (JP); Toru Araki, Aso (JP); Shinji Onishi, Yokohama (JP); Yuji Otsuka, Anjo (JP)

(73) Assignees: AISIN AW CO., LTD., Anjo (JP); NOK CORPORATION, Tokyo (JP)

( * ) Notice: Subject to any disclaimer, the term of this patent is extended or adjusted under 35 U.S.C. 154(b) by 182 days.

(21) Appl. No.: 16/473,270

(22) PCT Filed: Dec. 27, 2017

(86) PCT No.: PCT/JP2017/046942
§ 371 (c)(1),
(2) Date: Jun. 25, 2019

(87) PCT Pub. No.: WO2018/131487
PCT Pub. Date: Jul. 19, 2018

(65) Prior Publication Data
US 2020/0141493 A1    May 7, 2020

(30) Foreign Application Priority Data
Jan. 16, 2017   (JP) .............................. JP2017-005094

(51) Int. Cl.
*F16J 15/00*    (2006.01)
*F16J 15/06*    (2006.01)
(Continued)

(52) U.S. Cl.
CPC .............. *F16J 15/002* (2013.01); *F01M 1/10* (2013.01); *F16H 57/0454* (2013.01); *F16J 15/061* (2013.01); *F01M 2001/0292* (2013.01)

(58) Field of Classification Search
CPC .. F16J 15/00; F16J 15/02; F16J 15/021; F16J 15/08; F16J 15/022; F16J 15/46;
(Continued)

(56) References Cited

U.S. PATENT DOCUMENTS

| 3,899,880 A | 8/1975 | Rohs |
| 2008/0018059 A1* | 1/2008 | Otuka ................. F16J 15/3216 277/650 |

(Continued)

FOREIGN PATENT DOCUMENTS

| JP | S64-35175 A | 2/1989 |
| JP | 2014-15967 A | 1/2014 |

(Continued)

OTHER PUBLICATIONS

Hardness comparison of materials (Year: 2014).*
Mar. 6, 2018 International Search Report issued in International Patent Application No. PCT/JP2017/046942.

*Primary Examiner* — Nathan Cumar
(74) *Attorney, Agent, or Firm* — Oliff PLC (57) ABSTRACT

A seal structure between an oil outlet formed in a first case and an oil inlet formed in a second case and having an end face facing an end face of the oil outlet with a clearance between the end faces, the seal structure including an annular first seal disposed in an increased-diameter hole, which is formed on an outlet side or an inlet side of an oil passage in one of the oil outlet and the oil inlet and has a larger diameter than the oil passage, such that the first seal contacts a step surface located at a boundary between the oil passage and the increased-diameter hole; and an annular second seal harder than the first seal and disposed in the increased-diameter hole such that the second seal contacts the first seal and the end face of the other of the oil outlet and the oil inlet.

20 Claims, 5 Drawing Sheets

(51) Int. Cl.
*F01M 1/10* (2006.01)
*F16H 57/04* (2010.01)
*F01M 1/02* (2006.01)

(58) Field of Classification Search
CPC .......... F16J 15/48; F16J 15/002; F16J 15/162; F16J 15/40; F16J 15/06; F16J 15/061; F16J 15/0831; F16J 15/062; F16H 57/0454; F01M 1/10
USPC ........................................................ 277/353
See application file for complete search history.

(56) References Cited

U.S. PATENT DOCUMENTS

2011/0291364 A1* 12/2011 Otsuka .................. F16J 15/166
  277/434
2016/0230756 A1   8/2016 Kito et al.
2018/0180070 A1   6/2018 Uesugi et al.

FOREIGN PATENT DOCUMENTS

| JP | 2015-75164 A | 4/2015 |
| JP | 2015-86841 A | 5/2015 |
| JP | 2017-09058 A | 1/2017 |

* cited by examiner

|   |     | C-1 | C-2 | C-3 | C-4 | B-1 | B-2 | F-1 |
|---|-----|-----|-----|-----|-----|-----|-----|-----|
| D | 1st | ○   |     |     |     |     | ●   | ○   |
|   | 2nd | ○   |     |     |     | ○   |     |     |
|   | 3rd | ○   |     | ○   |     |     |     |     |
|   | 4th | ○   |     |     | ○   |     |     |     |
|   | 5th | ○   | ○   |     |     |     |     |     |
|   | 6th |     | ○   |     | ○   |     |     |     |
|   | 7th |     | ○   | ○   |     |     |     |     |
|   | 8th |     | ○   |     |     | ○   |     |     |
| REV1 |  |     |     | ○   |     |     | ○   |     |
| REV2 |  |     |     |     | ○   |     | ○   |     |

※ ○: ENGAGED
●: ENGAGED WHEN ENGINE BRAKE IN OPERATION

SEAL STRUCTURE AND TRANSMISSION INCLUDING THE SAME

BACKGROUND

The disclosure of the present disclosure relates to seal structures between an oil outlet portion of a first case and an oil inlet portion of a second case and transmissions including the same.

A seal structure for a valve body that is formed by placing a first constituent member (first case) having all of valve insertion holes formed therein and a second constituent member (second case) having all of oil passages formed therein on top of each other is conventionally known in the art (see, e.g., JP 2017-09058 A (FIG. 12)). This seal structure for the valve body includes annular grooves formed in the mating surface of the first constituent member so as to surround the openings of the oil passages and O-rings made of, e.g., rubber and placed in the grooves so as to function as seal portions. A seal structure between first and second members such as an oil pump and a valve body is also conventionally known which includes a cylindrical coupling member having a first end fitted in a first oil passage of the first member and a second end fitted in a second oil passage of the second member (see, e.g., JP 2015-75164 A). In this seal structure, seal grooves where seal members are placed and protruding portions each protruding radially outward from an end face of the seal groove are formed in the outer periphery of the first and second ends of the coupling member. The first and second ends of the coupling member are press-fitted in the first oil passage or the second oil passage via the protruding portion.

SUMMARY

In the seal structure described in JP 2017-09058 A, however, when the O-rings are subjected to a high oil pressure resulting from pulsation of oil flowing in the oil passages, the O-rings may enter the clearance between the first and second constituent members, which may result in degradation in sealing performance and reduction in durability of the seal members due to deformation of the seal members. In the seal structure described in JP 2015-75164 A, the protruding portions of the coupling member are press-fitted in the first and second oil passages, thereby restraining degradation in sealing performance due to deformation of the seal members and improving durability of the seal members. In the seal structure described in JP 2015-75164 A, however, since the seal grooves are formed, the axial length of the coupling member is increased accordingly. Moreover, the sectional area of the first and second oil passages need be increased in order for an oil passage in the coupling member to have a sufficient sectional area. In the seal structure described in JP 2015-75164 A, the overall space that is occupied by the seal structure is therefore large. Accordingly, even if degradation in sealing performance and reduction in durability due to deformation of the seal members can be restrained, it is difficult to reduce the space occupied around the oil pump and the valve body.

An exemplary aspect of the disclosure provides a seal structure capable of improving sealing performance and durability by restraining deformation of a seal member and capable of reducing its occupied space and a transmission including the seal structure.

A seal structure of the present disclosure is a seal structure between an oil outlet formed in a first case and an oil inlet formed in a second case and having an end face facing an end face of the oil outlet with a clearance between the end faces, the seal structure including: an annular first seal disposed in an increased-diameter hole, which is formed on an outlet side or an inlet side of an oil passage in one of the oil outlet and the oil inlet and has a larger diameter than the oil passage, such that the first seal contacts a step surface located at a boundary between the oil passage and the increased-diameter hole; and an annular second seal harder than the first seal and disposed in the increased-diameter hole such that the second seal contacts the first seal and the end face of the other of the oil outlet and the oil inlet.

The seal structure of the present disclosure includes the annular first and second seals that are disposed in the increased-diameter hole formed on the outlet or inlet side of the oil passage in one of the oil outlet of the first case and the oil inlet of the second case and having a larger diameter than the oil passage. The first seal is disposed in the increased-diameter hole so as to contact the step surface located at the boundary between the oil passage and the increased-diameter hole. The second seal is harder than the first seal, is disposed in the increased-diameter hole so as to contact the first seal and the end face of the other of the oil outlet and the oil inlet, and is surrounded by the clearance between the end face of the oil outlet and the end face of the oil inlet. In such a seal structure, the first seal contacting the step surface presses the second seal against the end face of the other of the oil outlet and the oil inlet when oil is supplied from the first case side toward the second case side. The seal structure thus provides satisfactory sealing performance between the oil outlet of the first case and the oil inlet of the second case. Since the second seal is made of a material harder than the first seal, the second seal can be restrained from being partially deformed by a high oil pressure resulting from pulsation of oil and entering the clearance between the end face of the oil outlet and the end face of the oil inlet. Moreover, since the second seal is disposed between the first seal and the end face of the other of the oil outlet and the oil inlet, the second seal can very satisfactorily restrain the first seal softer than the second seal from being partially deformed by a high oil pressure resulting from pulsation of oil and entering the clearance. Furthermore, since the seal structure of the present disclosure does not require a tubular coupling member, the space occupied by the seal structure can be reduced as compared to a seal structure including the tubular coupling member. As a result, according to the seal structure of the present disclosure, sealing performance and durability can be improved by restraining deformation of the seals and the occupied space can be reduced.

DETAILED DESCRIPTION OF EMBODIMENTS

A mode for carrying out the disclosure of the present disclosure will be described below with reference to the accompanying drawings.

Figure 1:
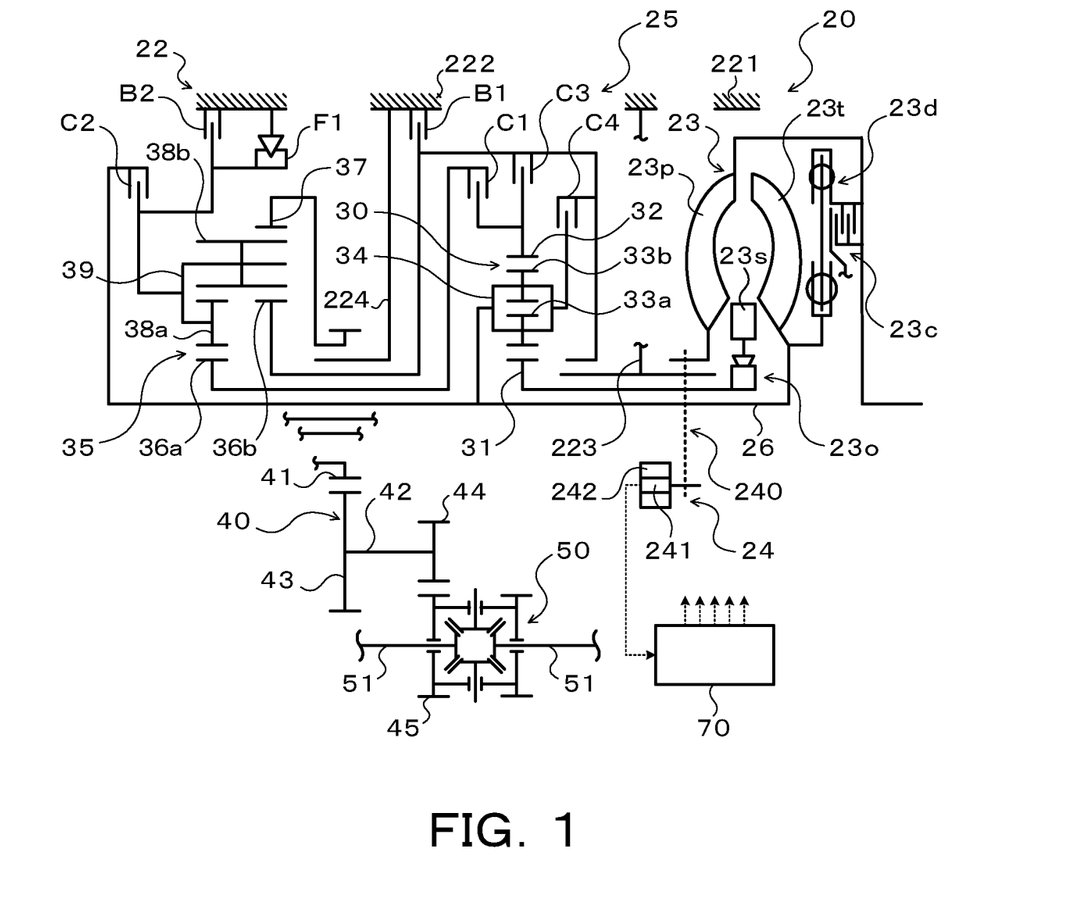
FIG. 1 is a schematic configuration diagram of a power transmission device including a seal structure of the present disclosure.

FIG. 1 is a schematic configuration diagram of a power transmission device 20 including a seal structure of the present disclosure. The power transmission device 20 shown in the FIG. 1 is connected to a crankshaft of an engine serving as a motor, not shown, mounted on a front-wheel drive vehicle and can transmit power from the engine to right and left drive wheels (front wheels), not shown. As shown in the figure, the power transmission device 20 includes a transmission case 22, a starting device (fluid transmission device) 23, an oil pump 24, an automatic transmission 25 accommodated in the transmission case 22, a gear mechanism (gear train) 40, a differential gear (differential mechanism) 50, etc.

The transmission case 22 includes, in addition to a converter housing 221 and a transaxle case 222 fastened (fixed) to the converter housing 221, a front support 223 fastened (fixed) to the transaxle case 222 so as to be located between the converter housing 221 and the transaxle case 222 and a center support 224 fastened (fixed) to the transaxle case 222. In the present embodiment, the converter housing 221, the transaxle case 222, and the center support 224 are made of, e.g., an aluminum alloy and the front support 223 is made of a steel material (iron alloy) or an aluminum alloy.

The starting device 23 includes a front cover coupled to the crankshaft of the engine and/or a rotor of an electric motor via a drive plate, not shown, etc., an input-side pump impeller 23p having a pump shell firmly fixed to the front cover, an output-side turbine runner 23t coupled to an input shaft 26 of the automatic transmission 25, a stator 23s disposed between the pump impeller 23p and the turbine runner 23t to adjust the flow of hydraulic fluid from the turbine runner 23t to the pump impeller 23p, a one-way clutch 23o that is supported by a stator shaft, not shown, and allows the stator 23s to rotate in only one direction, etc. The pump impeller 23p, the turbine runner 23t, and the stator 23s form a torque converter having a torque amplifying function.

The starting device 23 further includes a lockup clutch 23c that connects and disconnects the front cover and the input shaft 26 of the automatic transmission 25 to and from each other and a damper device 23d that damps vibration between the front cover and the input shaft 26 of the automatic transmission 25. In the present embodiment, the lockup clutch 23c is a multi-plate friction hydraulic clutch having a plurality of friction engagement plates (friction plates and separator plates). However, the lockup clutch 23c may be a single-plate friction hydraulic clutch. The starting device 23 may include a fluid coupling that does not have the stator 23s.

Figure 2:
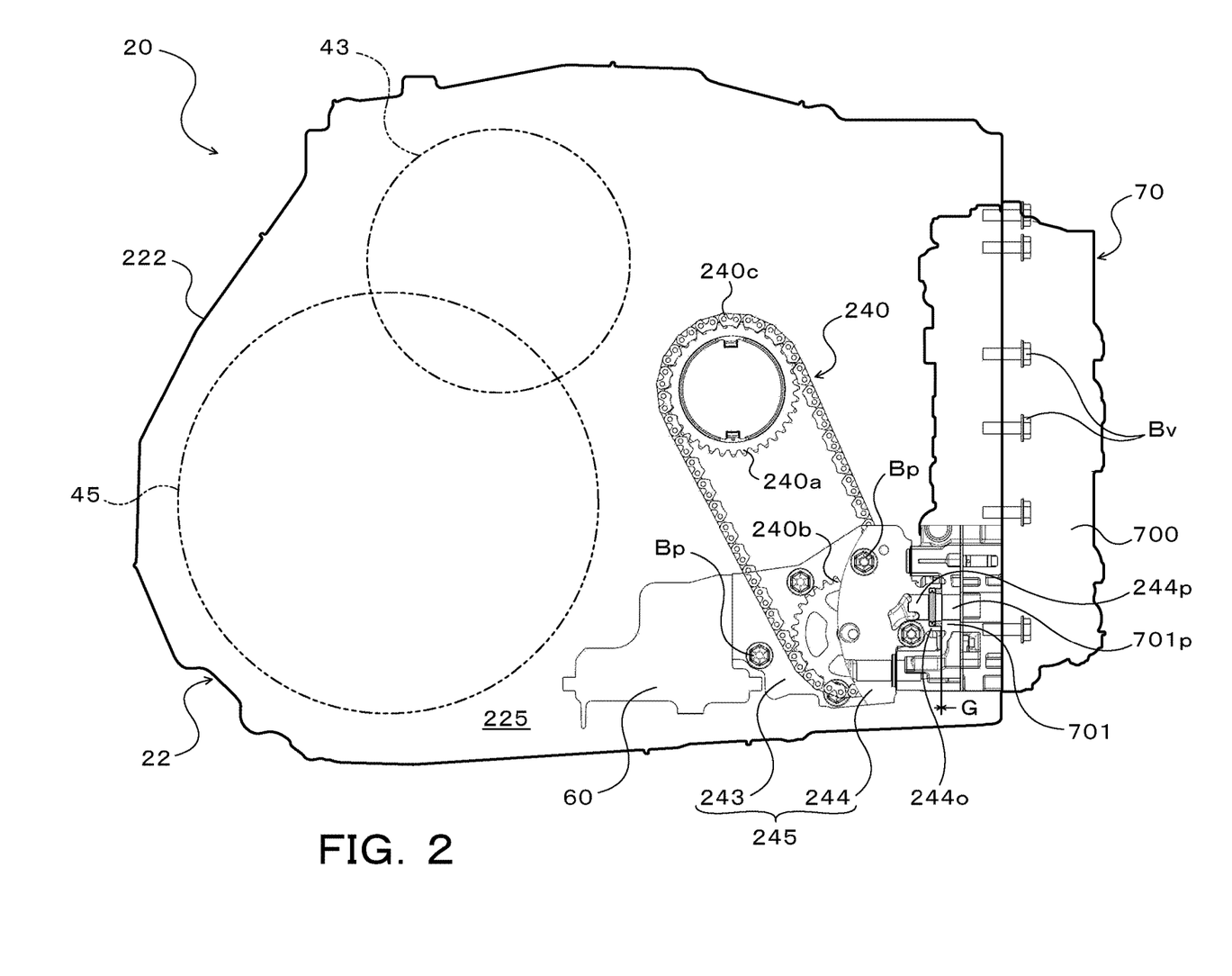
FIG. 2 is another schematic configuration diagram of the power transmission device shown in FIG. 1.

The oil pump 24 is a gear pump having an external gear (inner rotor) 241 coupled to the pump impeller 23p of the starting device 23 via a chain-driven mechanism 240, an internal gear (outer rotor) 242 meshing with the external gear 241, a housing 245 (see FIG. 2) serving as a first case and including a pump body 243 and a pump cover 244 which define a gear chamber, not shown, accommodating the external gear 241 and the internal gear 242, etc. In the present embodiment, the oil pump 24 is disposed in the transaxle case 222 of the transmission case 22 on a different axis from the input shaft 26 of the automatic transmission 25. This oil pump 24 is driven by the power from the engine via the chain-driven mechanism 240 to suck hydraulic oil (ATF) stored in a hydraulic oil reservoir portion 225 (see FIG. 2) provided at the bottom of the transaxle case 222 through a strainer 60 and pump the sucked hydraulic oil into a hydraulic control device 70. As shown in FIG. 2, the chain-driven mechanism 240 includes a drive sprocket 240a that rotates with the pump impeller 23p of the starting device 23, a driven sprocket 240b that rotates with the external gear of the oil pump 24, and a chain 240c wound around the drive sprocket 240a and the driven sprocket 240b. The pump body 243 and the pump cover 244 (the housing 245) are fastened to the transaxle case 222 via a plurality of bolts Bp extending in the axial direction of the power transmission device 20 (the input shaft 26 etc.).

The automatic transmission 25 is configured as an 8-speed transmission, and as shown in FIG. 1, includes a double-pinion type first planetary gear mechanism 30, a Ravigneaux type second planetary gear mechanism 35, and four clutches C1, C2, C3, C4, two brakes B1, B2, and a one-way clutch F1 which change a power transmission path from the input side to the output side.

The first planetary gear mechanism 30 has a sun gear (fixed element) 31 that is an external gear, a ring gear 32 that is an internal gear disposed concentrically with the sun gear 31, and a planetary carrier 34 holding a plurality of pairs of pinion gears 33a, 33b, each pair of pinion gears 33a, 33b meshing with each other with one of the pinion gears 33a, 33b meshing with the sun gear 31 and the other meshing with the ring gear 32, such that the plurality of pairs of pinion gears 33a, 33b can rotate (turn) and revolve. As shown in the figure, the sun gear 31 of the first planetary gear mechanism 30 is coupled (fixed) to the transmission case 22 via the front support 223 such that the sun gear 31 cannot rotate with respect to the transmission case 22. The planetary carrier 34 of the first planetary gear mechanism 30 is connected to the input shaft 26 such that the planetary carrier 34 can rotate with the input shaft 26. The first planetary gear mechanism 30 is a so-called reduction gear. The first planetary gear mechanism 30 reduces the speed of the power transmitted to the planetary carrier 34 serving as an input element and outputs the resultant power from the ring gear 32 serving as an output element.

The second planetary gear mechanism 35 includes a first sun gear 36a and a second sun gear 36b which are external gears, a ring gear 37 that is an internal gear disposed concentrically with the first and second sun gears 36a, 36b, a plurality of short pinion gears 38a meshing with the first sun gear 36a, a plurality of long pinion gears 38b meshing with the second sun gear 36b and the plurality of short pinion gears 38a and meshing with the ring gear 37, and a planetary carrier 39 holding the plurality of short pinion gears 38a and the plurality of long pinion gears 38b such that the plurality of short pinion gears 38a and the plurality of long pinion gears 38b can rotate (turn) and revolve. The ring gear 37 of the second planetary gear mechanism 35 functions as an output member of the automatic transmission 25, and the power transmitted from the input shaft 26 to the ring gear 37 is transmitted to the right and left drive wheels via the gear mechanism 40, the differential gear 50, and a drive shaft 51. The planetary carrier 39 is supported by the transmission case 22 via the one-way clutch F1, and the planetary carrier 39 is allowed to rotate in only one direction by the one-way clutch F1.

The clutch C1 connects and disconnects the ring gear 32 of the first planetary gear mechanism 30 and the first sun gear 36a of the second planetary gear mechanism 35 to and from each other. The clutch C2 connects and disconnects the input shaft 26 and the planetary carrier 39 of the second planetary gear mechanism 35 to and from each other. The clutch C3 connects and disconnects the ring gear 32 of the first planetary gear mechanism 30 and the second sun gear 36b of the second planetary gear mechanism 35 to and from each other. The clutch C4 connects and disconnects the planetary carrier 34 of the first planetary gear mechanism 30 and the second sun gear 36b of the second planetary gear mechanism 35 to and from each other. In the present embodiment, multi-plate friction hydraulic clutches, each having a hydraulic servo formed by a piston, a plurality of friction engagement plates (friction plates and separator plates), an engagement oil chamber and a centrifugal oil pressure cancel chamber to which hydraulic oil is supplied, etc., are used as the clutches C1, C2, C3, C4.

The brake B1 holds (connects) the second sun gear 36b of the second planetary gear mechanism 35 stationary to the transmission case 22 and disconnects the second sun gear 36b from the transmission case 22. The brake B2 holds the planetary carrier 39 of the second planetary gear mechanism 35 stationary to the transmission case 22 and disconnects the planetary carrier 39 from the transmission case 22. In the present embodiment, multi-plate friction hydraulic clutches, each having a hydraulic servo formed by a piston, a plurality of friction engagement plates (friction plates and separator plates), an engagement oil chamber to which hydraulic oil is supplied, etc., are used as the brakes B1, B2.

The one-way clutch F1 includes an inner race connected (fixed) to the planetary carrier 39 of the second planetary gear mechanism 35, an outer race, a plurality of sprags, a plurality of springs (leaf springs), a retainer, etc. The one-way clutch F1 transmits torque via each sprag when the outer race rotates in one direction with respect to the inner race. The one-way clutch F1 rotates the inner race and the outer race relative to each other when the outer race rotates in the other direction with respect to the inner race. The one-way clutch F1 may have a configuration other than the sprag configuration, such as a roller configuration.

Figure 3:
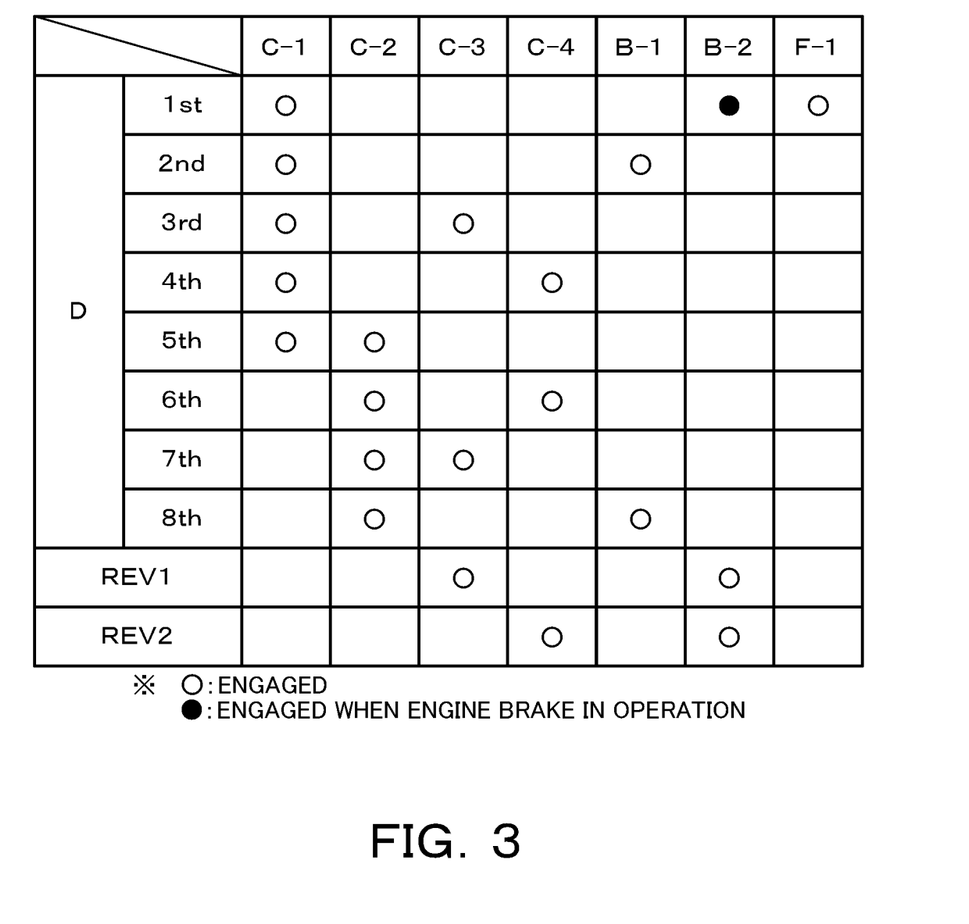
FIG. 3 is an operation table showing the relationship between each shift speed of an automatic transmission included in the power transmission device of FIG. 1 and the operating state of clutches and brakes.

The clutches C1 to C4 and the brakes B1, B2 operate according to supply and discharge of hydraulic oil by the hydraulic control device 70. FIG. 3 is an operation table showing the relationship between each shift speed of the automatic transmission 25 and the operating state of the clutches C1 to C4, the brakes B1, B2, and the one-way clutch F1. The automatic transmission 25 provides first to eighth forward speeds and first and second reverse speeds by creating the states of the clutches C1 to C4 and the brakes B1, B2 as shown in the operation table of FIG. 3. At least one of the clutches C1 to C4 and the brake B1, B2 may be a meshing engagement element such as a dog clutch.

The gear mechanism 40 has a counter drive gear 41 coupled to the ring gear 37 of the second planetary gear mechanism 35 of the automatic transmission 25, a counter driven gear 43 fixed to a counter shaft 42, which extends parallel to the input shaft 26 of the automatic transmission 25, and meshing with the counter drive gear 41, a drive pinion gear 44 formed on (or fixed to) the counter shaft 42, and a differential ring gear 45 meshing with the drive pinion gear 44 and coupled to the differential gear 50. As shown in FIG. 1, the counter drive gear 41 of the gear mechanism 40 is rotatably supported via a bearing by the center support 224 that is fixed to the transaxle case 222 via a plurality of bolts so as to be located between the first and second planetary gear mechanisms 30, 35.

The hydraulic control device 70 is connected to the above oil pump 24 that sucks hydraulic oil from the hydraulic oil reservoir portion 225 and discharges the sucked hydraulic oil. The hydraulic control device 70 regulates the pressure of hydraulic oil from the oil pump 24 to generate an oil pressure required by the starting device 23 and the automatic transmission 25 and supplies the hydraulic oil to elements to be lubricated such as various bearings. The hydraulic control device 70 includes a valve body 700 serving as a second case, a primary regulator valve that regulates the pressure of hydraulic oil from the oil pump 24 to generate a line pressure, a secondary regulator valve, a plurality of linear solenoid valves (pressure regulating valves) each regulating the line pressure, which is a source pressure supplied from the primary regulator valve, to generate an oil pressure for a corresponding one of the clutches etc., etc.

In the present embodiment, as shown in FIG. 2, the valve body 700 of the hydraulic control device 70 is fastened separately from the oil pump 24 (the pump body 243 and the pump cover 244) to a side of the transaxle case 222 of the transmission case 22 via a plurality of bolts By extending in a direction perpendicular to the axial direction of the power transmission device 20 (the input shaft 26 etc.). With the valve body 700 being fastened to the transaxle case 222, the end face of an oil outlet portion 244o (oil outlet) formed in the pump cover 244 of the oil pump 24 and the end face of an oil inlet portion 701 (oil inlet) formed in the valve body 700 face each other with small clearance G therebetween and an oil passage 701p in the oil inlet portion 701 communicates with an oil passage 244p in the oil outlet portion 244o.

Figure 4:
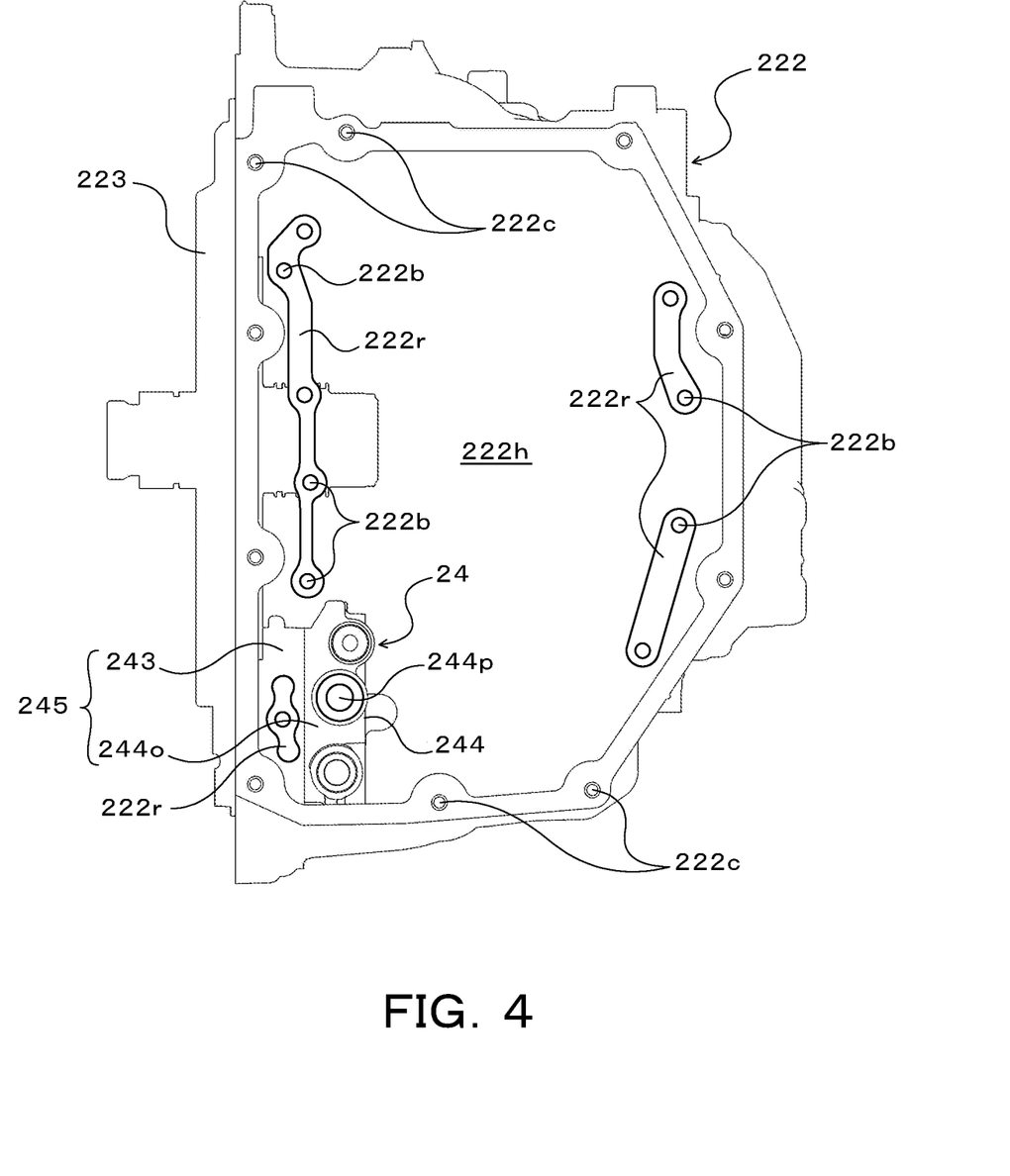
FIG. 4 is a schematic configuration diagram of a case of the power transmission device.

As shown in FIG. 4, the transaxle case 222 has an opening 222h in its side. The transaxle case 222 further has a plurality of ribs 222r each having one or more bolt holes 222b and formed so as to face the opening 222h. The bolts By inserted through the valve body 700 are screwed into the bolt holes 222b of each rib 222r, whereby the valve body 700 is fastened to the transaxle case 222. The transaxle case 222 further has a plurality of bolt holes 222c formed so as to surround the opening 222h, and bolts inserted through a cover, not shown, are screwed into the bolt holes 222c. The cover fastened to the transaxle case 222 thus covers the valve body 700 (the hydraulic control device 70) so as not to expose the valve body 700 (the hydraulic control device 70) to the outside.

Figure 5:
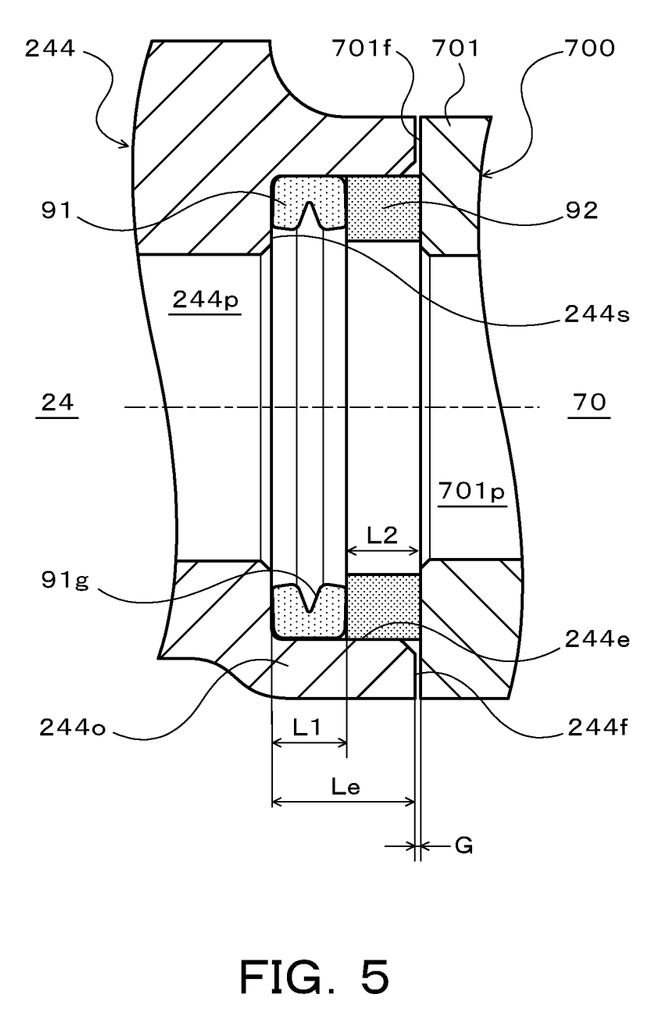
FIG. 5 is an enlarged sectional view of the seal structure of the present disclosure.

FIG. 5 is an enlarged sectional view of a seal structure between the oil outlet portion 244o formed in the pump cover 244 (the housing 245) of the oil pump 24 and the oil inlet portion 701 formed in the valve body 700 of the hydraulic control device 70.

As shown in FIG. 5, the oil outlet portion 244o of the pump cover 244 has, in addition to an oil passage 244p communicating with a discharge port, not shown, of the oil pump 24, an increased-diameter hole 244e located on the outlet side of the oil passage 244p and communicating with the oil passage 244p. Both the oil passage 244p and the increased-diameter hole 244e have a circular section, and the inner diameter of the increased-diameter hole 244e is larger than that of the oil passage 244p. A step surface 244s extending in the radial direction of the oil passage 244p and the increased-diameter hole 244e is formed at the boundary between the oil passage 244p and the increased-diameter hole 244e. In the present embodiment, the oil passage 701p of the oil inlet portion 701 has a circular section having the same diameter as the oil passage 244p.

A first seal member 91 (first seal) and a second seal member 92 (second seal) are disposed in the increased-diameter hole 244e of the pump cover 244. The first seal member 91 is made of a relatively soft material such as resin or a rubber material, e.g., acrylic rubber and has an annular shape. The first seal member 91 has an annular groove 91g having a V-shaped section and recessed radially outward from the inner peripheral surface toward the outer peripheral surface of the first seal member 91. In the present embodiment, the inner diameter (minimum value) of the first seal member 91 in a free state (before being disposed in the increased-diameter hole 244e) is larger than the inner diameter of the oil passage 244p of the oil outlet portion 244o (the inner diameter of the outer periphery of a chamfered portion formed along the inner periphery of the step surface 244s) and the oil passage 701p of the oil inlet portion 701. The outer diameter of the first seal member 91 in the free state is slightly larger than the inner diameter of the increased-diameter hole 244e, and the first seal member 91 is press-fitted in the increased-diameter hole 244e such that one end face of the first seal member 91 contacts the step surface 244s.

The second seal member 92 is made from a resin harder than the material of the first seal member 91, such as, e.g., polytetrafluoroethylene, and has an annular shape. The amounts of expansion and contraction of the second seal member 92 in the axial direction and the radial direction are therefore smaller than the amounts of expansion and contraction of the first seal member 91 in the axial direction and the radial direction. The inner diameter (minimum value) of the second seal member 92 in a free state (before being disposed in the increased-diameter hole 244e) is smaller than the inner diameter (minimum value) of the first seal member 91 in the free state and is larger than the inner diameter of the oil passage 244p of the oil outlet portion 244o and the oil passage 701p of the oil inlet portion 701. The outer diameter of the second seal member 92 in the free state is slightly larger than the inner diameter of the increased-diameter hole 244e, and the second seal member 92 is press-fitted in the increased-diameter hole 244e such that one end face of the second seal member 92 contacts the opposite end face of the first seal member 91 from the step surface 244s.

In the present embodiment, the axial lengths L1, L2 of the first and second seal members 91, 92 in the free state are such that the opposite end face of the second seal member 92 from the first seal member 91 protrudes outward (toward the valve body 700) beyond an end face 244f of the oil outlet portion 244o when both of the first and second seal members 91, 92 are disposed in the increased-diameter hole 244e. That is, the sum of the axial length L1 (maximum value) of the first seal member 91 in the free state and the axial length L2 (maximum value) of the second seal member 92 in the free state is larger than the axial length Le from the step surface 244s to the end face 244f of the oil outlet portion 244o and larger than the sum of the axial length Le and the design maximum value (design value+tolerance) of the axial length of the clearance G.

When the valve body 700 is fastened to the transaxle case 222, an end face 701f of the oil inlet portion 701 of the valve body 700 is brought into contact with the end face of the second seal member 92 which protrudes beyond the end face 244f of the oil outlet portion 244o. By fastening the valve body 700 to the transaxle case 222 in this state with the bolts By, the first and second seal members 91, 92 are compressed between the step surface 244s of the oil outlet portion 244o and the end face 701f of the oil inlet portion 701. The first seal member 91 thus closely contacts the step surface 244s and the inner peripheral surface of the increased-diameter hole 244e and closely contacts the second seal member 92. The second seal member 92 closely contacts the inner peripheral surface of the increased-diameter hole 244e and, as the second seal member 92 is pressed by the elastically deformed first seal member 91, closely contacts the end face 701f of the oil inlet portion 701.

When the fastening of the valve body 700 to the transaxle case 222 is completed, small clearance G is defined between the end face 244f of the oil outlet portion 244o and the end face 701f of the oil inlet portion 701, as shown in FIG. 5. That is, with the first and second seal members 91, 92 being mounted (after the fastening of the valve body 700 is completed), the sum of the axial length L1 of the first seal member 91 and the axial length L2 of the second seal member 92 is larger than the axial length Le from the step surface 244s to the end face 244f of the oil outlet portion 244o as shown in FIG. 5 even though mainly the first seal member 91 is elastically deformed. The second seal member 92 is therefore surrounded by the clearance G between the end face 244f of the oil outlet portion 244o and the end face 701f of the oil inlet portion 701.

When hydraulic oil is pumped from the oil pump 24 to the valve body 700 of the hydraulic control device 70 in the power transmission device 20 including such a seal structure, the first seal member 91 is pressed against the inner peripheral surface of the increased-diameter hole 244e by the oil pressure of the hydraulic oil from the oil passage 244p. The second seal member 92 is thus pressed against the end face 701f of the oil inlet portion 701 on the valve body 700 side by the first seal member 91 contacting the step surface 244s on the oil pump 24 side. Moreover, since the hydraulic oil enters the annular groove 91g of the first seal member 91, the first seal member 91 is extended in the axial direction by the hydraulic oil in the groove 91g. The second seal member 92 can thus be very satisfactorily brought into close contact with the end face 701f of the oil inlet portion 701 on the valve body 700 side. This provides very satisfactory sealing performance between the oil outlet portion 244o of the oil pump 24 and the oil inlet portion 701 of the valve body 700 in the power transmission device 20.

The second seal member 92 surrounded by the clearance G between the end face 244f of the oil outlet portion 244o and the end face 701f of the oil inlet portion 701 is harder than the first seal member 91. The second seal member 92 can therefore be satisfactorily restrained from being partially deformed by a high oil pressure resulting from pulsation of the hydraulic oil from the oil pump 24 and entering the clearance G Moreover, since the second seal member 92 is disposed between the first seal member 91 and the end face 701f of the oil inlet portion 701, the second seal member 92 can very satisfactorily restrain the first seal member 91 softer than the second seal member 92 from being partially deformed by a high oil pressure due to pulsation of the hydraulic oil and entering the clearance G In addition, since the above seal structure does not require a tubular coupling member, the space occupied by the above seal structure can be reduced as compared to a seal structure including the tubular coupling member. As a result, in the power transmission device 20, sealing performance and durability can be improved by restraining deformation of the first and second seal members 91, 92 and the occupied space can be reduced.

Moreover, in the power transmission device 20, the sum of the axial length L1 of the first seal member 91 and the axial length L2 of the second seal member 92 in the free state is larger than the sum of the axial length Le from the step surface 244s to the end face 244f of the oil outlet portion 244o and the design maximum value of the clearance G (axial length). With the first and second seal members 91, 92 being mounted, the sum of the axial length L1 of the first seal member 91 and the axial length L2 of the second seal member 92 is larger than the axial length Le from the step surface 244s to the end face 244f of the oil outlet portion 244o. Accordingly, even if the interval between the end face 244f of the oil outlet portion 244o and the end face 701f of the oil inlet portion 701, namely the clearance varies due to manufacturing tolerance etc., the small clearance G can be provided between the end face 244f of the oil outlet portion 244o and the end face 701f of the oil inlet portion 701 with the oil pump 24 and the valve body 700 being coupled to each other. The first and second seal members 91, 92 thus provide satisfactory sealing performance between the oil outlet portion 244o and the oil inlet portion 701.

In the power transmission device 20, the inner diameter of the first seal member 91 in the free state is larger than the inner diameter of the second seal member 92 in the free state and the inner diameter of the oil passage 244p in the oil outlet portion 244o and the oil passage 701p in the oil inlet portion 701. The inner diameter of the second seal member 92 in the free state is larger than that of the oil passages 244p, 701p. Accordingly, with the first and second seal members 91, 92 being mounted, the inner diameters of the first and second seal members 91, 92 can be equal to or larger than the inner diameter of the oil passages 244p, 701p. This can restrain the elastically deformed first seal member 91 from extending onto the inner peripheral surface of the second seal member 92 and the inner peripheral surface of the oil passage 701p (the chamfered portion of the step surface 244s). Moreover, the first seal member 91 presses the second seal member 92 against the end face 701f of the oil inlet portion 701, which provides satisfactory sealing performance. The flow of the hydraulic oil from the oil passage 244p can also be restrained from being blocked in the increased-diameter hole 244e by the first and second seal members 91, 92, whereby the oil pump 24 has satisfactory discharge efficiency.

Moreover, in the power transmission device 20, the oil pump 24 is disposed in the transaxle case 222 of the transmission case 22, the valve body 700 of the hydraulic control device 70 is fastened to the transaxle case 222 such that the end face 701f of the oil inlet portion 701 contacts the end face of the second seal member 92. By applying such a seal structure as described above to this configuration, what is called a face seal structure in which a housing (pump cover) of an oil pump and a valve body are fastened together around an oil outlet portion and an oil inlet portion which abut on each other need not be used between the oil outlet portion 244o of the oil pump 24 and the oil inlet portion 701 of the valve body 700. This can further reduce the space occupied around the oil pump 24 and the valve body 700.

The space occupied around the oil pump 24 and the valve body 700 is reduced by applying such a seal structure as described above to the power transmission device 20 in which the oil pump 24 is disposed on a different axis from the input shaft 26 of the automatic transmission 25. The oil pump 24 can thus be easily disposed on a different axis from the input shaft 26 of the automatic transmission 25, and the automatic transmission 25 and thus the power transmission device 20 can be reduced in size. The above seal structure may be applied to a power transmission device in which the oil pump 24 is disposed coaxially with the input shaft 26 of the automatic transmission 25. The oil pump 24 may include a gear mechanism that transmits the power from the engine to the external gear 241, instead of the chain-driven mechanism 240.

In the above embodiment, the first and second seal members 91, 92 are disposed in the increased-diameter hole 244e formed in the oil outlet portion 244o of the pump cover 244 (the oil pump 24). However, the present disclosure is not limited to this. That is, such an increased-diameter hole as described above may be formed on the inlet side of the oil passage 701p in the oil inlet portion 701 of the valve body 700, and the first and second seal members 91, 92 may be disposed in the increased-diameter hole of the oil inlet portion 701. In this case, the first seal member 91 is disposed so as to contact a step surface located at the boundary between the oil passage 701p and the increased-diameter hole, and the second seal member 92 is disposed in the increased-diameter hole so as to contact the opposite end face of the first seal member 91 from the step surface and the end face 244f of the oil outlet portion 244o.

As described above, a seal structure of the present disclosure is a seal structure between an oil outlet portion (244o) formed in a first case (244, 245) and an oil inlet portion (701) formed in a second case (700) and having an end face (701f) facing an end face (244f) of the oil outlet portion (244o) with clearance (G) therebetween, the seal structure including: an annular first seal member (91) disposed in an increased-diameter hole (244e), which is formed on an outlet or inlet side of an oil passage (244p) in one of the oil outlet portion (244o) and the oil inlet portion (701) and has a larger diameter than the oil passage (244p), such that the first seal member (91) contacts a step surface (244s) located at a boundary between the oil passage (244p) and the increased-diameter hole (244e); and an annular second seal member (92) harder than the first seal member (91) and disposed in the increased-diameter hole (244e) such that the second seal member (92) contacts the first seal member (91) and the end face (701f) of the other of the oil outlet portion (244o) and the oil inlet portion (701).

The seal structure of the present disclosure includes the annular first and second seal members that are disposed in the increased-diameter hole formed on the outlet or inlet side of the oil passage in one of the oil outlet portion of the first case and the oil inlet portion of the second case and having a larger diameter than the oil passage. The first seal member is disposed in the increased-diameter hole so as to contact the step surface located at the boundary between the oil passage and the increased-diameter hole. The second seal member is harder than the first seal member and is disposed in the increased-diameter hole so as to contact the first seal member and the end face of the other of the oil outlet portion and the oil inlet portion. The second seal member is surrounded by the clearance between the end face of the oil outlet portion and the end face of the oil inlet portion. Such a seal structure has satisfactory sealing performance between the oil outlet portion of the first case and the oil inlet portion of the second case because the first seal member contacting the step surface presses the second seal member against the end face of the other of the oil outlet portion and the oil inlet portion when oil is supplied from the first case side toward the second case side. Since the second seal member is made of a material harder than the first seal member, the second seal member can be restrained from being partially deformed by a high oil pressure resulting from pulsation of oil and entering the clearance between the end face of the oil outlet portion and the end face of the oil inlet portion. Moreover, since the second seal member is disposed between the first seal member and the end face of the other of the oil outlet portion and the oil inlet portion, the second seal member can very satisfactorily restrain the first seal member softer than the second seal member from being partially deformed by a high oil pressure resulting from pulsation of oil and entering the clearance. Furthermore, since the seal structure of the present disclosure does not require a tubular coupling member, the space occupied by the seal structure can be reduced as compared to a seal structure including the tubular coupling member. As a result, according to the seal structure of the present disclosure, sealing performance and durability can be improved by restraining deformation of the seal members and the occupied space can be reduced.

The sum of an axial length (L1) of the first seal member (91) and an axial length (L2) of the second seal member (92) in a free state may be larger than the sum of an axial length (Le) from the step surface (244s) to the end face (244f) of the one of the oil outlet portion (244o) and the oil inlet portion (701) and an axial length of the clearance (G). This allows small clearance to be provided between the end face of the oil outlet portion and the end face of the oil inlet portion with the first and second cases being coupled together. As a result, the first and second seal members provide satisfactory sealing performance between the oil outlet portion and the oil inlet portion.

The first seal member (91) may have an annular groove (91g) recessed radially outward from an inner peripheral surface toward an outer peripheral surface of the first seal member (91). The first seal member can thus be extended in the axial direction by oil entering the annular groove, whereby the second seal member can be satisfactorily brought into close contact with the end face of the oil inlet portion on the second case side.

An inner diameter of the first seal member (91) may be larger than an inner diameter of the second seal member (92) and an inner diameter of the oil passage (244p). This can restrain the elastically deformed first seal member from extending onto an inner peripheral surface of the second seal member and an inner peripheral surface of the oil passage.

The first case may be a housing (244, 245) of an oil pump (24) and the second case may be a valve body (700) of a hydraulic control device. The oil pump may be either a mechanical pump or an electric pump as long as it generates an oil pressure. The second case may be, e.g., a case of a brake actuator etc. instead of the valve body.

A transmission of the present disclosure is a transmission (25) including the above seal structure, wherein the oil pump (24) and the valve body (700) are separately fixed to a case (22, 222) of the transmission (25), and the valve body (700) is fastened to the case (22, 222) such that the end face (701f) of the other of the oil outlet portion (244o) and the oil inlet portion (701) contacts an end face of the second seal member (92).

That is, by applying such a seal structure as described above to this transmission, what is called a face seal structure in which a housing of an oil pump and a valve body are fastened together around an oil outlet portion and an oil inlet portion which abut on each other need not be used between the oil outlet portion of the oil pump and the oil inlet portion of the valve body. This can further reduce the space occupied around the oil pump 24 and the valve body 700.

The oil pump (24) may be driven by a motor of a vehicle and may be disposed on a different axis from an input shaft (26) of the transmission (25). Since the space occupied around the oil pump 24 and the valve body 700 is reduced by using such a seal structure as described above, the oil pump can be easily disposed on a different axis from the input shaft of the transmission and the transmission can be reduced in size.

It should be understood that the disclosure of the present disclosure is not limited in any way to the above embodiment and various modifications can be made without departing from the spirit and scope of the present disclosure. The above embodiment is merely a specific form of the disclosure described in "SUMMARY" and is not intended to limit the elements of the disclosure described in "SUMMARY."

INDUSTRIAL APPLICABILITY

The disclosure of the present disclosure is applicable to the manufacturing industries of seal structures and transmissions, etc.

The invention claimed is:

1. A seal structure between an oil outlet formed in a first case and an oil inlet formed in a second case and having an end face facing an end face of the oil outlet with a clearance between the end faces, the seal structure comprising:
   an annular first seal disposed in an increased-diameter hole, which is formed on an outlet side or an inlet side of an oil passage in one of the oil outlet and the oil inlet and has a larger diameter than the oil passage, such that the first seal contacts a step surface located at a boundary between the oil passage and the increased-diameter hole; and
   an annular second seal harder than the first seal and disposed in the increased-diameter hole such that the second seal contacts the first seal and the end face of the other of the oil outlet and the oil inlet,
   wherein, in an axial direction, the step surface, the first seal, the second seal and the end face of the other of the oil outlet and the oil inlet are arranged in this order such that the step surface first contacts the first seal, the first seal second contacts the second seal and the second seal third contacts the end face of the other of the oil outlet and the oil inlet.

2. The seal structure according to claim 1, wherein
   a sum of an axial length of the first seal and an axial length of the second seal in a free state is larger than a sum of an axial length from the step surface to the end face of the one of the oil outlet and the oil inlet and an axial length of the clearance.

3. The seal structure according to claim 2, wherein
   the first seal has an annular groove recessed radially outward from an inner peripheral surface toward an outer peripheral surface of the first seal.

4. The seal structure according to claim 3, wherein
   an inner diameter of the first seal is larger than an inner diameter of the second seal and an inner diameter of the oil passage.

5. The seal structure according to claim 4, wherein
   the first case is a housing of an oil pump and the second case is a valve body of a hydraulic control device.

6. A transmission including the seal structure according to claim 5, wherein
   the oil pump and the valve body are separately fixed to a case of the transmission, and the valve body is fastened to the case such that the end face of the other of the oil outlet and the oil inlet contacts an end face of the second seal.

7. The transmission according to claim 6, wherein
   the oil pump is driven by a motor of a vehicle and is disposed on a different axis from an input shaft of the transmission.

8. The seal structure according to claim 2, wherein
   an inner diameter of the first seal is larger than an inner diameter of the second seal and an inner diameter of the oil passage.

9. The seal structure according to claim 8, wherein
   the first case is a housing of an oil pump and the second case is a valve body of a hydraulic control device.

10. A transmission including the seal structure according to claim 9, wherein
the oil pump and the valve body are separately fixed to a case of the transmission, and the valve body is fastened to the case such that the end face of the other of the oil outlet and the oil inlet contacts an end face of the second seal.

11. The transmission according to claim 10, wherein
the oil pump is driven by a motor of a vehicle and is disposed on a different axis from an input shaft of the transmission.

12. The seal structure according to claim 1, wherein
the first seal has an annular groove recessed radially outward from an inner peripheral surface toward an outer peripheral surface of the first seal.

13. The seal structure according to claim 12, wherein
an inner diameter of the first seal is larger than an inner diameter of the second seal and an inner diameter of the oil passage.

14. The seal structure according to claim 13, wherein
the first case is a housing of an oil pump and the second case is a valve body of a hydraulic control device.

15. A transmission including the seal structure according to claim 14, wherein
the oil pump and the valve body are separately fixed to a case of the transmission, and the valve body is fastened to the case such that the end face of the other of the oil outlet and the oil inlet contacts an end face of the second seal.

16. The transmission according to claim 15, wherein
the oil pump is driven by a motor of a vehicle and is disposed on a different axis from an input shaft of the transmission.

17. The seal structure according to claim 12, wherein
the first case is a housing of an oil pump and the second case is a valve body of a hydraulic control device.

18. The seal structure according to claim 1, wherein
an inner diameter of the first seal is larger than an inner diameter of the second seal and an inner diameter of the oil passage.

19. The seal structure according to claim 18, wherein
the first case is a housing of an oil pump and the second case is a valve body of a hydraulic control device.

20. The seal structure according to claim 1, wherein
the first case is a housing of an oil pump and the second case is a valve body of a hydraulic control device.

* * * * *